Sept. 4, 1956  F. E. BAKER, SR  2,761,572
APPARATUS FOR PARKING AND STORING MOTOR VEHICLES
Filed Aug. 3, 1954  4 Sheets-Sheet 1
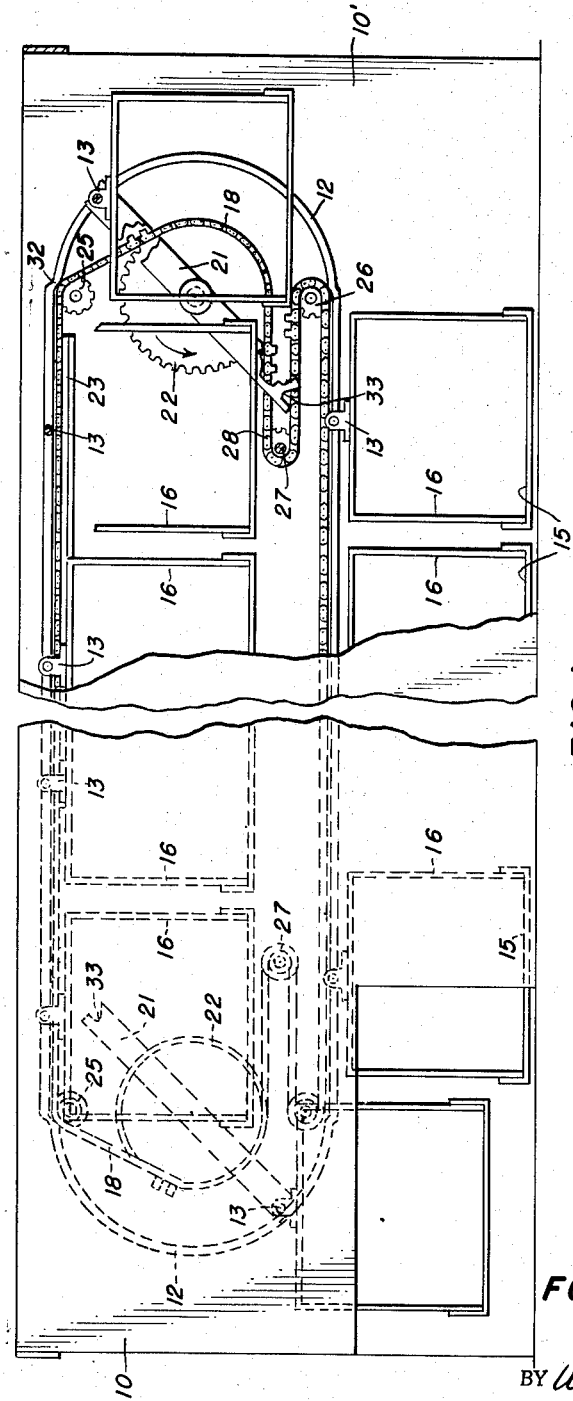
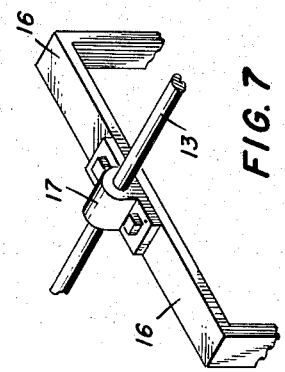
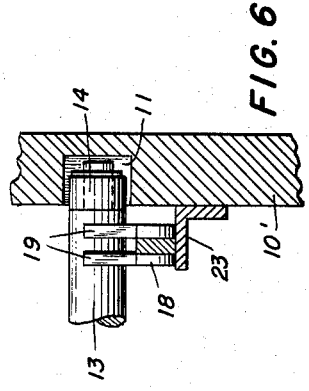
INVENTOR
*FOREST E. BAKER, SR.*
BY *Whittemore, Hulbert & Belknap*
ATTORNEYS Sept. 4, 1956 F. E. BAKER, SR 2,761,572
APPARATUS FOR PARKING AND STORING MOTOR VEHICLES
Filed Aug. 3, 1954 4 Sheets-Sheet 2

INVENTOR
FOREST E. BAKER, SR.
BY Whittemore, Hulbert & Belknap
ATTORNEYS

Sept. 4, 1956     F. E. BAKER, SR     2,761,572
APPARATUS FOR PARKING AND STORING MOTOR VEHICLES
Filed Aug. 3, 1954     4 Sheets-Sheet 3

INVENTOR
*FOREST E. BAKER, SR.*

BY *Whittemore, Hulbert & Belknap*

ATTORNEYS

Sept. 4, 1956 F. E. BAKER, SR 2,761,572
APPARATUS FOR PARKING AND STORING MOTOR VEHICLES
Filed Aug. 3, 1954 4 Sheets-Sheet 4
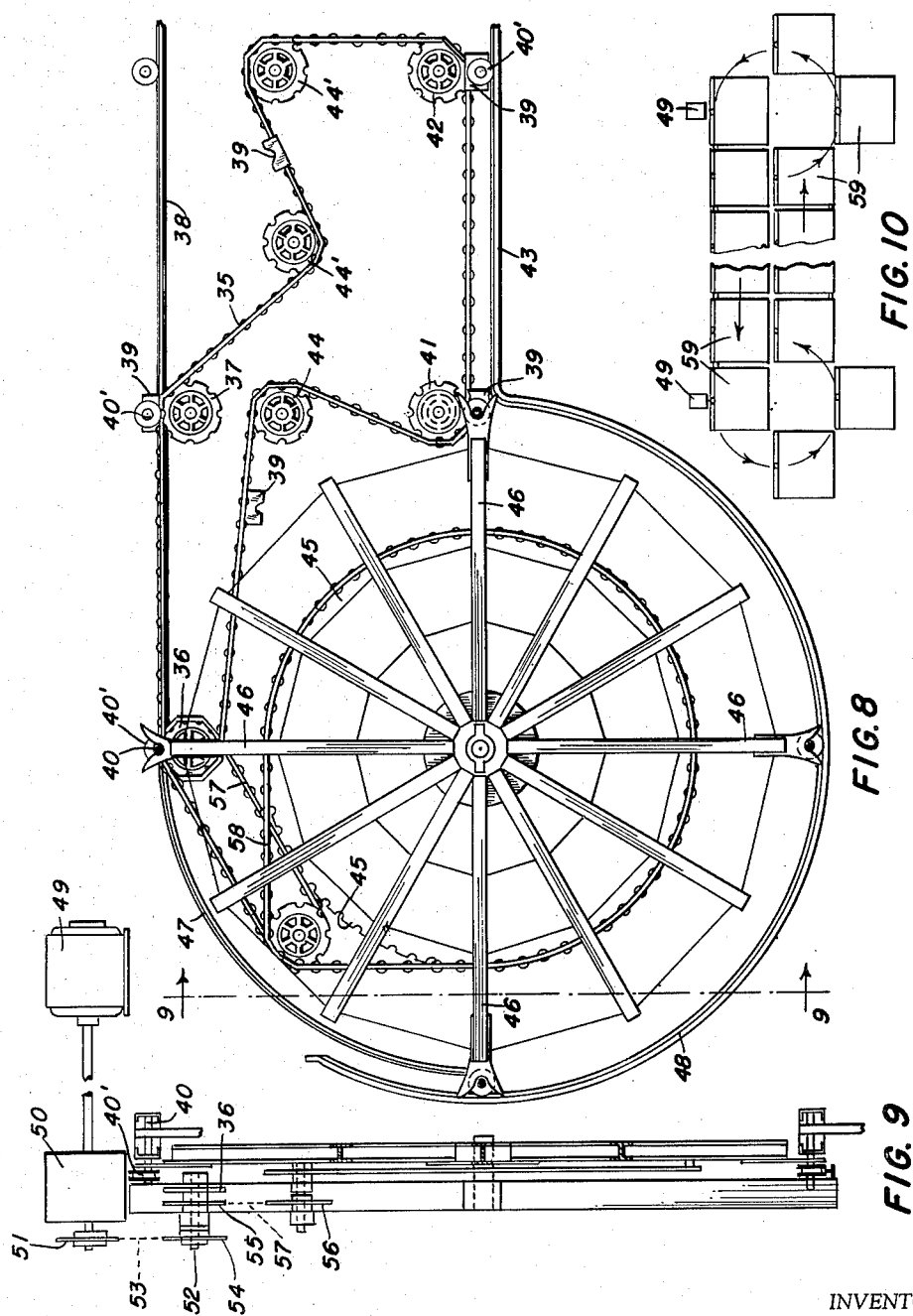
INVENTOR
*FOREST E. BAKER, SR.*
BY *Whittemore, Hulbert + Belknap*
ATTORNEYS ়
United States Patent Office 2,761,572
Patented Sept. 4, 1956

2,761,572

APPARATUS FOR PARKING AND STORING MOTOR VEHICLES

Forest Edward Baker, Sr., Charleston, W. Va.

Application August 3, 1954, Serial No. 447,608

7 Claims. (Cl. 214—16.1)

The present invention relates to an apparatus for conveying bodies from one level to another and, although it has broad application to the transfer of articles in buildings and the like, it is particularly applicable to the parking and storing of motor vehicles. More specifically the invention pertains to a series of movable platforms and a novel arrangement of tracks for supporting the platforms in side-by-side relation and at a plurality of levels so that a maximum number of vehicles may be stored while utilizing a minimum of ground area.

At the present time motor vehicles are parked and stored either on a lot lying substantially in a single plane or, where several floors at different levels are utilized, ramps form an essential part of the structure to permit the vehicles to be moved from one level to another. Where cars are maneuvered under their own power to move them into parked position, it is necessary to provide relatively large aisles or the like between or adjacent the spaces forming the parking or storage areas. It is one of the objects of the present invention to provide a motor driven conveyor type of means for moving a plurality of platforms both horizontally and vertically, the platforms being easily accessible from a street or roadway so that wide aisles and large floor areas are unnecessary to provide ample storage space.

It is another object of the invention to provide novel mechanism for operating the platforms.

It is a further object of the invention to provide guides or tracks to permit horizontal and vertical movement of the platforms whereby successive platforms may be each aligned with entrance and exit driveways whereby vehicles may be moved to or from storage positions.

Other objects will be apparent from the following description of the invention when taken with the accompanying drawings illustrating a preferred embodiment thereof and in which Fig. 1 is a side elevation, partly in section, of the apparatus employed;

Fig. 6 is a section taken on line 6—6 of Fig. 5;

Fig. 7 is a fragmentary perspective of the means for suspending the platforms from supporting bars;

Fig. 8 is a partial elevation of one modification of the invention;

Fig. 9 is a section taken on line 9—9 of Fig. 8; and

Fig. 10 is a diagrammatic elevation of the apparatus shown in Fig. 8 illustrating the manner in which the platforms are suspended.

Figure 2:
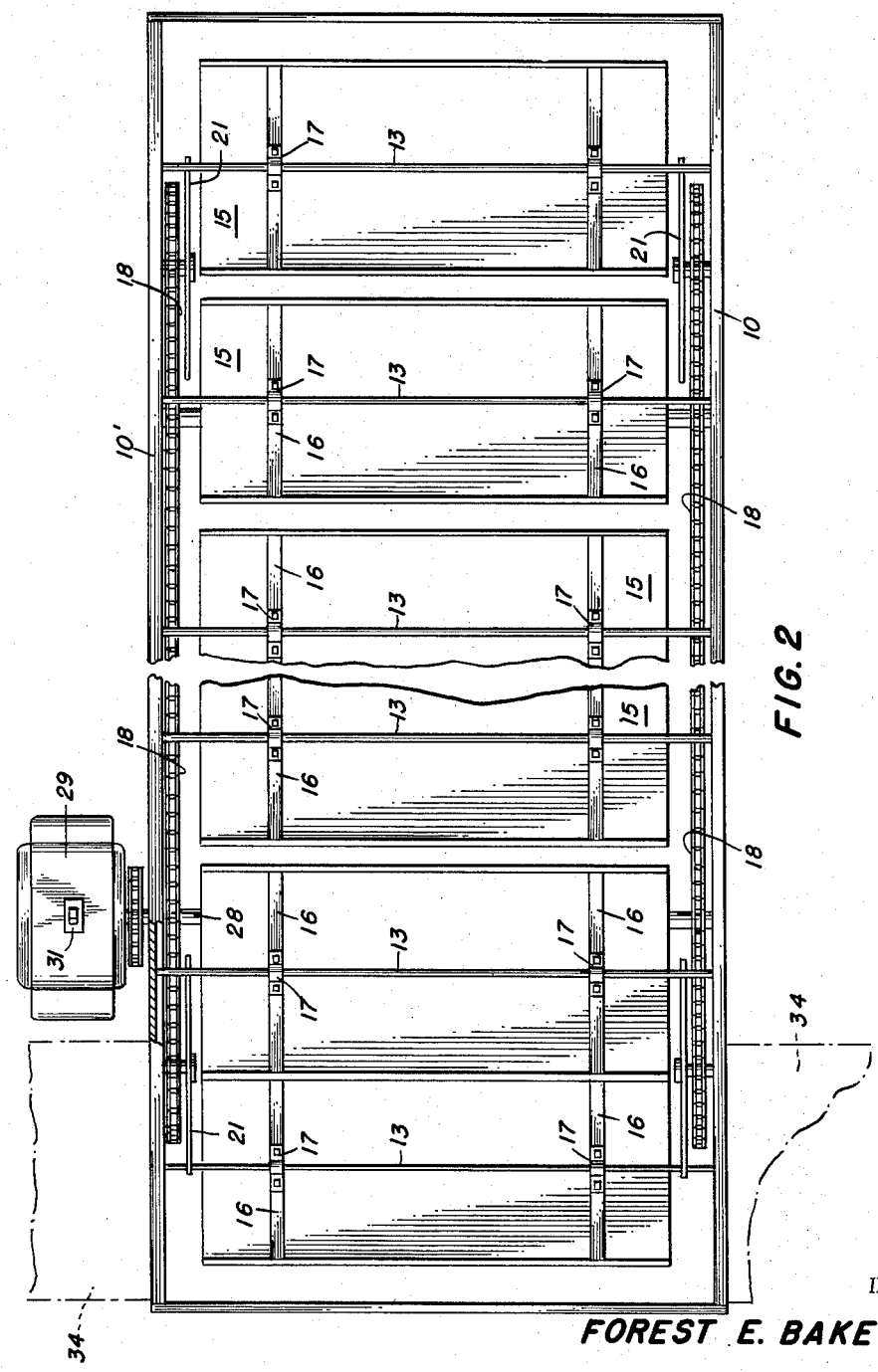
Fig. 2 is a top plan view of the mechanism shown in Fig. 1.
Figure 3:
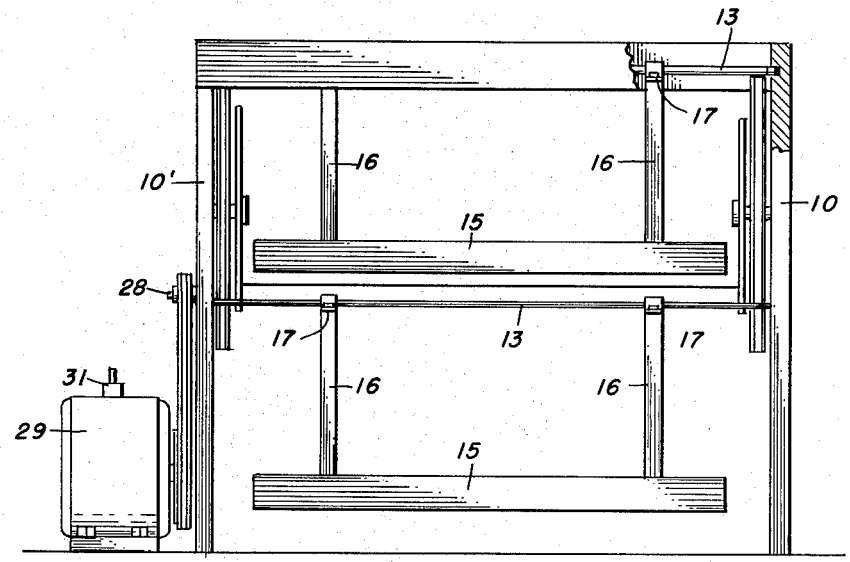
Fig. 3 is an end elevation of the apparatus shown in Fig. 1.
Figure 4:
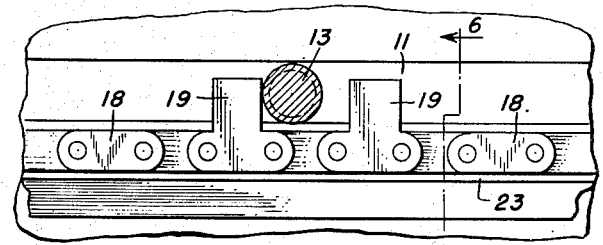
Fig. 4 is a fragmentary view of a guide track showing chain means for engaging an element movable therein.
Figure 5:
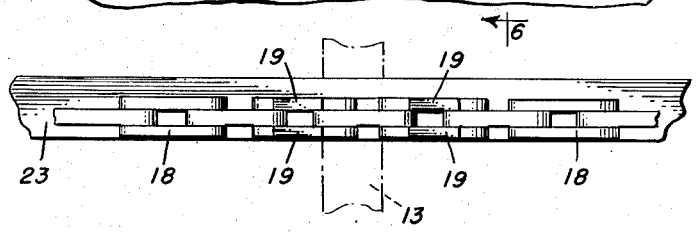
Fig. 5 is a top plan view of the chain shown in Fig. 4.

In the drawings it will be seen that a pair of parallel vertical side frames or walls 10, 10' are each provided with a closed channel-shaped guide or track 11 consisting of relatively long upper and lower runs connected at their ends by semi-circular portions indicated at 12. Crossbeams 13, which may have rollers 14 journaled on the ends thereof, are adapted to travel in the guides 11 and are constrained to move in a path corresponding to the outline of the guides. Platforms 15 each having two or more inverted U-shaped supporting frames 16, having suspension bearings 17 centrally of their upper horizontal arm, are suspended from the cross-beams. The arrangement of the beams and supporting frames is such that the platforms, whether loaded or unloaded, remain horizontal at all times, the center of gravity thereof being in the vertical plane of the beams.

The mechanism for moving the platforms in the guides consists of opposite endless chains 18 having attached thereof a plurality of dogs 19 which engage the beams while the beams are positioned in the horizontal runs of the guides, and a pair of opposite rotatable transfer arms 21 at each end of the guide. It will be noted that these arms are rotatable about the axis of the semi-circular portions 12 of the guides. The transfer arms are attached to gears 22 adapted to be driven by the conveyor chains 18.

As shown in Fig. 1, each chain 18 is supported adjacent the upper run of the guides by rails 23 extending the full length of the upper run in order that the dogs 19 may positively engage the beams positioned in the upper run. It is obvious that that portion of the chain adjacent the lower run need not be wholly supported other than by the cross beams 13 resting on the lower portion of the guide channel and underlying the chain at that level.

It will be seen from the drawings that sprockets 25, 26 are journaled adjacent each end of the upper and lower runs of each guide track and that the chain passes over and meshes with these sprockets. It will also be noted that there is a drive sprocket 27 near each end of each guide, these latter sprockets being fixed to shafts 28, either or both of which may be designated as drive shafts. As shown in the drawings, motor 29 is coupled to one of the drive shafts, suitable switching means 31 being provided for starting and stopping the motor. Sprockets 27 are so spaced from sprockets 26 that that portion of the chain extending from sprocket 26 to and around sprocket 27, gear 22 and sprocket 25 is a multiple of the distance between successive dogs of the chain. This arrangement insures registration of the dogs with the cross-beams when a platform has been moved by arms 21 from one level of the guide to the other level. The circumferential lengths of the semi-circular portions of the guides, as well as the lengths and speed of rotation of arms 21, are also so calculated that the beams will be brought into registry with the dogs when the beams move from the curved portions of the guide tracks onto the straight portions of the guides. It is also to be noted that the length of that portion of each chain 19 which extends from the end of the straight portion of the upper track to that end of the lower track directly therebeneath must be at least equal to or greater than the circumferential distance between the ends of the transfer arms as measured along the circular path of these rotating arms. Otherwise, successive dogs would travel through a distance less than that of the ends of the transfer arms and fail to register therewith as the cross-beams move into or out of the straight tracks as is necessary for proper operation of the mechanism.

One of the features of the tracks and their relation to the transfer arms and chains is a novel form of track cam for releasing the beams from the transfer arms at the end of the transfer operation. The camming of the beams is obtained by spacing the straight portions of the guides vertically a distance apart greater than the diametral distance between the ends of each of the semi-circular guides, the ends of the straight portions having a sharply inclined surface 32 adjacent the juncture of the straight portion of the track and the semi-circular portion thereof. As the dogs engage a beam they move the beam over the inclined camming surface 32 and release the beam from the beam engaging notches 33 at the ends of the transfer arms. In this manner the transfer arms clear the beams as the latter move from the semi-circular guides to the straight portions of the tracks.

As will be seen from the plan view of the apparatus, aligned entrance and exit driveways 34 are on a level with the floor of the platforms when the latter are in their lowermost position. While the driveways are shown as being in line with a platform about to be moved into the curved guide, it is apparent that it may be located at any suitable point or points between the ends of the straight guides. A vehicle is driven onto a platform from the driveway and, the drive motor being reversible, the platform moved in either direction a sufficient distance to bring an unloaded platform into line with the driveway. A similar procedure is followed when a vehicle is to be removed from storage.

It is obvious that the apparatus described provides for storage of the vehicles at a plurality of levels and that parking is simplified by eliminating the usual maneuvering incident to the parking of cars under their own power. The ground area occupied by the apparatus is considerably less than that required for parking an equal number of cars in a flat parking lot.

Referring to Figs. 8, 9, and 10, illustrating another form of the invention, it will be seen that an endless chain 35 is employed which engages only a pair of successive cross-beams 40 having rollers 40' which ride on each of the upper and lower sets of tracks. It is to be understood that similar chains are positioned on opposite sides of the frame as well as at both sides of the opposite end of the frame, the latter, of course, being oppositely disposed, as shown in Fig. 10. In this form of the invention, one portion of each of the chains 35 cooperates with sprockets 36, 37 to travel adjacent to and parallel with the upper set of tracks 38. The length of this portion of the chain is approximately equal to the distance between successive dogs 39 and sprocket 37 is disposed at the end of the straight portion of the upper set of tracks 38. Another portion of the chain is similarly passed over sprockets 41, 42 and is adjacent to and parallel to the lower set of tracks 43, sprockets 41 being disposed at the end of the lower set of tracks. The chain is then directed over idler sprockets 44, 44'. Also driven by the shaft carrying sprocket 36 is large sprocket 45 of which there is one on each of opposite sides of the frame. The latter has secured thereto transfer arms 46 each having a notched end for engaging cross-beams to move the platforms over the arcuate tracks 47, 48, forming extensions of the straight portions of the upper and lower tracks respectively and designed to facilitate transfer of the platforms from one set of tracks to the other set.

The means for driving the chains and transfer arms comprises a suitable motor 49 and speed reducer 50 having a sprocket 51 on the shaft thereof, this sprocket driving the shaft 52 of sprocket 36 through chain 53 and sprocket 54. Also fixed to this shaft is sprocket 55 which drives the transfer arm sprocket 45 through sprocket 56 and chains 57, 58. It is to be understood that the arrangement of sprockets and chains is duplicated at each side of the frame and at each end thereof. It is also apparent that the prime mover may be connected to the driving mechanism at each end of the frame either by mechanical means or through the employment of synchronous motors, any conventional means being utilized to effect the necessary timing of the movement of the platforms along the tracks with respect to rotation of the transfer arms.

In the last described arrangement of the translation mechanism, it will be observed that only two cross-arms are engaged by the chain dogs at each end of the upper and lower sets of tracks. The platforms 59 are in substantially abutting relation so that the platforms intermediate those engaged by the dogs are moved along the horizontal tracks by others having positive engagement with the chain dogs. It is, of course, obvious that by employing a reversible motor the platforms may be moved in opposite directions if desirable.

The present application is a continuation-in-part of my copending application Serial No. 200,644, filed December 13, 1950, and now abandoned.

The embodiments shown and described are preferred examples, but other modifications thereof are intended to be included in the invention as defined in the appended claims.

What is claimed is:

1. Apparatus for transferring vehicle supporting platforms from one level to another comprising spaced vertical frames, each of said frames having thereon vertically spaced straight upper and lower horizontal tracks, each of said tracks terminating in arcuate sections for guiding a platform from one track to the other, a plurality of cross-beams extending from one to the other of said frames and having the ends thereof movable along said tracks and arcuate sections, said supporting platforms each being suspended from one of said cross-beams, an endless chain having spaced dogs thereon adapted to engage those cross-beams resting on the straight portions of the guide tracks, a rotatable member at each end of one of said tracks, said member having a plurality of equally and circumferentially spaced transfer arms engageable with those cross-beams which rest on said arcuate sections, said cross-beams being engaged by said arms only and disengaged from said dogs during vertical transfer of said platforms from one to the other of said tracks, the length of that portion of the chain extending from one end of the upper track to that end of the lower track directly therebeneath being greater than the arcuate path of transfer between said tracks and a multiple of the distance between a successive pair of said dogs, and reversible motor driven means for advancing said chain and rotating said transfer arm.

2. Apparatus as claimed in claim 1 in which that portion of the chain extending from said end of the upper track to said end of the lower track is looped over at least one idler disposed between said tracks and between the opposite ends of said upper track.

3. Apparatus as claimed in claim 1 in which there is a chain portion adjacent each end of said upper track extending from one end of the upper track to that end of the lower track immediately therebeneath, each of said portions being looped over at least one idler disposed between said tracks and between the opposite ends of said upper track.

4. Apparatus for transferring vehicle supporting platforms from one level to another comprising spaced vertical frames, each of said frames having thereon vertically spaced straight upper and lower horizontal tracks, each of said tracks terminating in arcuate sections for guiding a platform from one track to the other, a plurality of cross-beams extending from one to the other of said frames and having the ends thereof movable along said tracks and arcuate sections, said supporting platforms each being suspended from one of said cross-beams, a pair of endless chains, one adjacent each end of said upper track, each of said chains having spaced dogs thereon adapted to engage those cross-beams resting on the straight portions of the guide tracks, a rotatable member adjacent each end of said upper track, said member having a plurality of equally and circumferentially spaced transfer arms engageable with those cross-beams which rest on said arcuate sections, said cross-beams being engaged by said arms only and disengaged from said dogs during vertical transfer of said platforms from one to the other of said tracks, the length of that portion of each chain extending from an end of the upper track to that end of the lower track directly therebeneath being greater than the arcuate path of transfer between said tracks and a multiple of the distance between a successive pair of said dogs, and motor driven means for advancing said chains and rotating said transfer arms.

5. Apparatus for positioning and storing vehicles comprising spaced parallel vertical frames, each of said frames having thereon a closed guide track, each track having vertically spaced straight upper and lower horizontal runs and a semi-circular portion connecting said runs at each end thereof, a plurality of cross-beams extending from one to the other of said frames and having the ends thereof movable along said guide tracks, a vehicle supporting platform suspended from each of said cross-beams, an endless chain having spaced dogs thereon adapted to engage cross-beams resting on the straight portions of the guide tracks, rotatable transfer arms engageable with cross-beams resting on each of the curved portions of the tracks, said guide tracks being provided with camming means adjacent the juncture of the straight portions of said tracks and said semi-circular portions of said tracks to release the cross-beams from said transfer arm, and motor driven means for advancing said chain and rotating said transfer arm.

6. Apparatus as defined in claim 5 in which chain supporting rails are disposed parallel and adjacent to the upper straight portion of each guide track.

7. Apparatus as defined in claim 5 in which the chain engages a sprocket adjacent each end of the lower run and another sprocket adjacent each end of the upper run, the length of the chain extending from a lower sprocket to an upper sprocket being greater than the length of the semi-circular portion of the track and being a multiple of the distance between a successive pair of said dogs.

References Cited in the file of this patent

UNITED STATES PATENTS

| | | |
|---|---|---|
| 694,767 | Mahoudeau | Mar. 4, 1902 |
| 2,260,528 | Levy et al. | Oct. 28, 1941 |
| 2,268,862 | Ellis | Jan. 6, 1942 |

FOREIGN PATENTS

| | | |
|---|---|---|
| 719,154 | Germany | Mar. 30, 1942 |